United States Patent [19]
Pickering

[11] 3,954,226
[45] May 4, 1976

[54] STRAP COILING MECHANISM

[76] Inventor: Phillip A. Pickering, 5823-177th Place SW., Lynnwood, Wash. 98036

[22] Filed: Apr. 8, 1974

[21] Appl. No.: 458,557

[52] U.S. Cl. ............................................... 242/96
[51] Int. Cl.² .................................... B65H 75/40
[58] Field of Search .............. 242/96, 105, 67.1, 85, 242/86.52, 74, 106, 81, 84, 68, 68.3, 55, 60

[56] References Cited
UNITED STATES PATENTS

| 1,199,790 | 10/1916 | Holcomb | 242/60 |
| 2,306,466 | 12/1942 | Patterson | 242/81 X |
| 2,826,376 | 3/1958 | Wallin | 242/81 |

Primary Examiner—Stanley N. Gilreath
Assistant Examiner—John M. Jillions
Attorney, Agent, or Firm—Cole & Jensen

[57] ABSTRACT

A mechanism for quickly and easily coiling items such as cargo straps comprising a two-piece, easily assembled and disassembled device including an elongated spool having the first end axially split to receive and secure the end of the strap to be wound and the second end cylindrical for relative rotational movement between the two parts. A crank and associated handle are secured to the outer extreme of the second end of the spool. The second element of the two-piece assembly is a combined shield and second handle portion, the handle portion being cylindrical and slideably and rotatably fitted over the cylindrical portion of the spool. The shield is a disc like member rigidly secured to one end of the cylindrical portion and extending radially outwardly therefrom such that when the mechanism is assembled the shield is placed facing the split end of the spool forming a means whereby the strap having one end entrapped by the split end may be uniformly coiled adjacent the shield or guide.

2 Claims, 4 Drawing Figures

STRAP COILING MECHANISM

BACKGROUND OF THE INVENTION

In the material handling industry it is necessary to secure loads prior to transport thereof and to secure tarps to protect material both during transport and storage. Tarps and the loads themselves are often secured by flexible straps which extend over the load, around the tarp and are then secured to a relatively fixed support means. The straps provide a wide line of contact between the hold-down or securing strap and the load itself thus distributing the pressure and reducing damage. Further, straps are less subject to tangling, knotting or similar impediments to rapid and convenient use than are ropes. Problems inherent in the use of straps are that they are bulky, absorb moisture and dirt and, if not handled correctly can consume a great deal of operator time, space on the vehicle and further, the improper handling will greatly reduce the expected life of the strap.

Ideally, when a load is removed or material uncovered, the securement strap should be coiled into a neat coil so that it may be stored in a small place and be quickly and easily applied to the next load. Since the straps are invariably subjected to adverse weather conditions they are often wet, dirty and often frayed. Because of these characteristics, it is not a particularly desirable job, often one which is avoided, to coil the straps in preparation for the next usage. While coiling straps the operator is often exposed to adverse weather conditions, soils his hands and often his clothes. To further complicate the use and care of straps, the operator often must coil the strap upon a readily available flat surface, often the ground which even in the most fortuitous circumstances is dirty and often wet and muddy.

To assure a reasonably long life to the straps it is necessary to provide a means whereby the straps may be quickly coiled without subjecting involved personnel for extended periods of time or subjecting them to unnecessary exposure. The present invention provides a simple two-piece assembly which accomplishes the above requirements and further, is inexpensive and may be stored and carried in a small space. The assembly, further, will allow an operator to coil a strap directly from the load, obviating the possibility of dragging it through the mud.

The prior art known to the present inventor, dealing with the aspect of coiling elongated material includes U.S. Pat. No. 271,165, granted Jan. 23, 1883 to Vaughn. This patent, directed to a fence making machine discloses a very complex coiling device, as best seen in FIG. 7, for urging the completed fence into a cylindrical package. U.S. Pat. No. 1,831,526, granted Nov. 10, 1931 to Dallas deals with a portable winterized winder for coiling strips of copper, brass or the like. U.S. Pat. No. 1,866,585, granted July 12, 1932 to Tenney discloses a three station or three coil mechanism adapted to manufacture and coil endless record bands. U.S. Pat. No. 2,387,758, granted Oct. 30, 1945 to Jaros deals with a visual educational device secured to the person's forehead and includes as a portion thereof a spool and handle combination moving a film strip before the eyes of the wearer. U.S. Pat. No. 2,463,728, granted Mar. 8, 1949 to Wallin, deals with an artificial respirator and includes a hand driven spool for coiling the sling 15. U.S. Pat. No. 2,855,973 granted Oct. 14, 1958 to Sabellico discloses a machine for winding cable into a uniform coil such that it may be welded together and used as a pad on top of a piling to protect the upper surface of the piling from the pile driver per se. U.S. Pat. No. 3,406,600, granted Oct. 22, 1968 to Minick deals with a means for unwrapping a portion of a coil from the interior thereof and includes as an integral part thereof a split ended spool for securing the end of the strip.

With the above noted prior art, problems and desires in mind it is an object of the present invention to provide a means for uniformly wrapping coils of strapping material wherein the person doing the coiling need not have actual contact with the strap.

It is another object of the present invention to provide a portable, inexpensive means for use in wrapping coils of straps wherein the completed coil is of a uniform wrap and easy to store.

It is still another object of the present invention to provide a strap coiling mechanism which is quickly and easily disassembled thereby taking very little storage room and being of very low total weight.

DETAILED DESCRIPTION OF THE DRAWINGS

Figure 1:
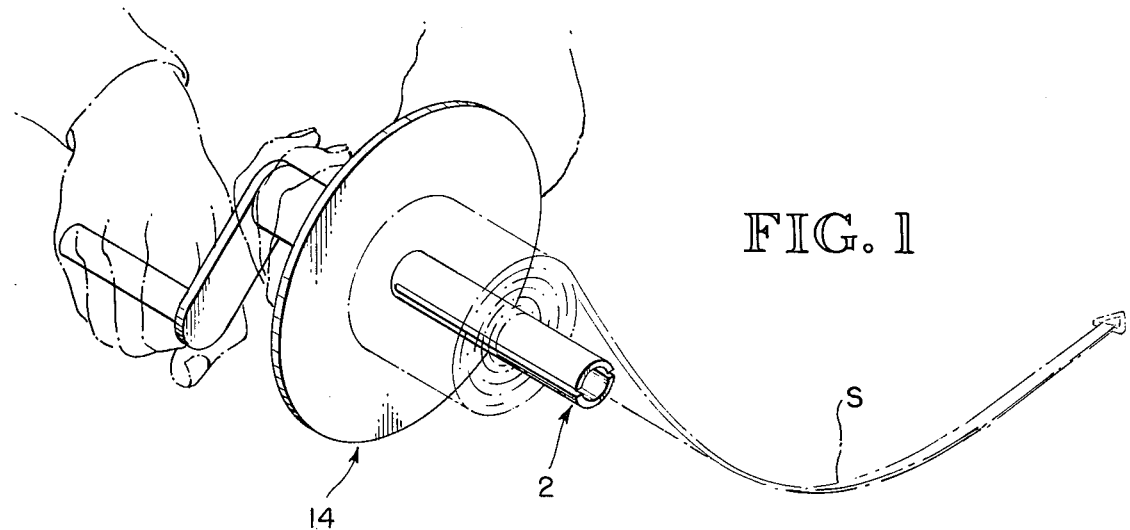
FIG. 1 is an environmental view of disclosing the inventive strap winding mechanism in use.
Figure 2:
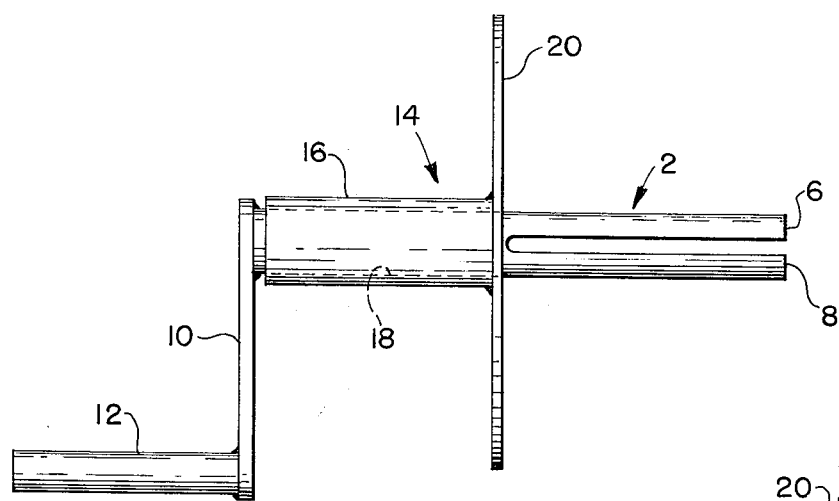
FIG. 2 is an elevational view of the inventive coil strap winding mechanism in the assembled condition.
Figure 3:
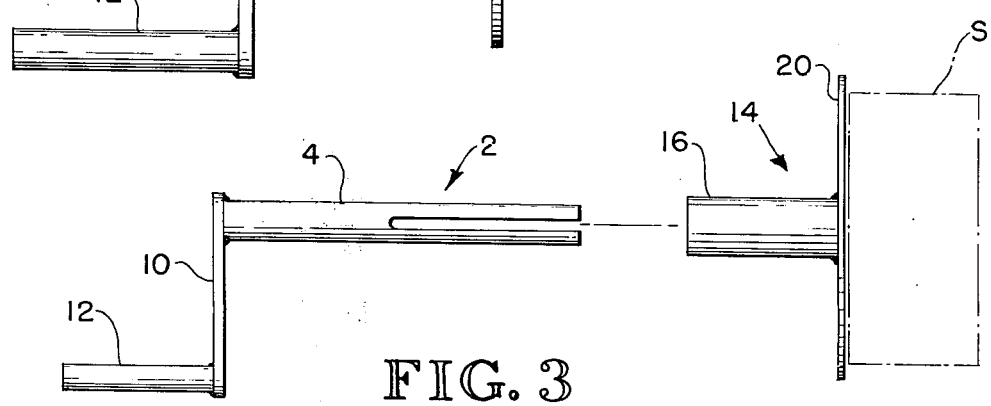
FIG. 3 is a view of the inventive strap winding mechanism disclosing the means for ejecting the coiled strap.

As seen in FIGS. 1 through 3, the strap coiling mechanism comprises two separate parts, a first spool and handle combination denoted generally as 2, and a second handle and guide mechanism denoted generally as 14. The spool and handle mechanism 2 includes a generally cylindrical spool element having a first smooth cylindrical end 4 and a second split end forming two fingers 6 and 8. Rigidly secured to the smooth cylindrical end 4 and extending outwardly therefrom is a radial crank arm 10 terminating in an axially extending handle 12.

The handle and guide mechanism generally denoted as 14 includes a hollow cylindrical handle mechanism adapted to overlie the cylindrical portion 4 of the spool and a radially extending disc shaped shield 20.

When assembled, the hollow cylinder 16 overlies cylinder 4 and is slideably and rotatably movable relative thereto and provides a handle whereby one of the user's hands will grasp the handle 16 and the other grasp the handle 12. Relative rotation of the cylinders 4 and 16 causes the bifurcated end forming fingers 6 and 8 to rotate.

When the end of a strap is placed between the fingers 6 and 8 and the handles relatively rotated the strap will be coiled about the spool ends 6 and 8 against the guide 20. When the coil is completed, relative axial movement between the cylinders 4 and 16 causes the coil to eject.

For storage the two portions 14 and 2 may be removed and placed at a convenient spot for later usage.

Figure 4:
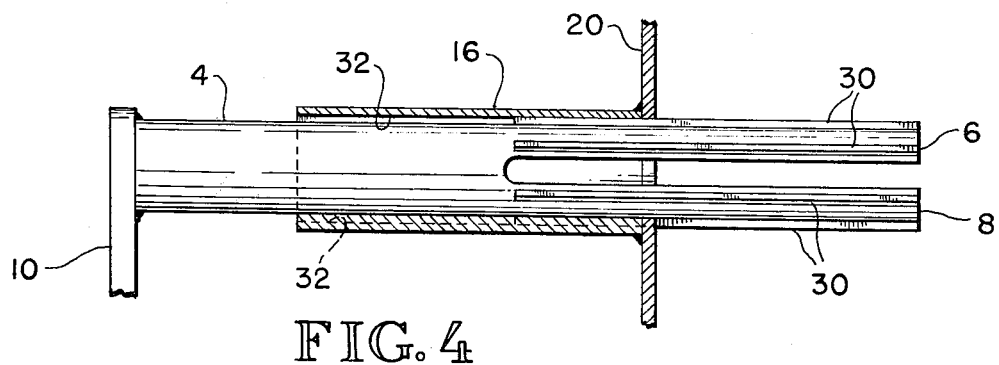
FIG. 4 is a partial sectional view of a specie of the present strap coiling mechanism.

As seen in FIG. 4, if it is desirable to have a larger center coil on the strap, the bifurcated end portion with fingers 6 and 8 may have their effective outside diameter increased by the addition of a plurality of ridges 30 extending in an axial direction. Of necessity the interior of the cylinder 16 must include a series of matching grooves 32 such that the handle may be passed over the spool end to a point where the cylinder 16 overlies smooth cylinder 4 prior to operation. The use of the axially extending ridges, further reduces the friction at contact between the coiled strap and the coiling spool.

Thus, as can be seen, the present invention provides a simple assembly whereby a strap may readily and easily be coiled. The individual coiling the strap can accomplish the task in far less time, need not have contact with the strap and can coil directly from the location of usage without first removing the strap, finding a convenient location and then coiling the strap. The assembly is of light weight and easily stored.

What is claimed is:

1. A strap coiling device comprising:
   a. a coiling spool including an elongated slot extending axially from an end thereof a distance equal to the width of the widest strap to be coiled and a smooth cylindrical portion opposite to the slotted end,
   b. radially extending crank arm means having a handle means secured to the outer end of the cylindrical portion to cause rotation of the coiling spool about its axis, and
   c. ejection and guide means having a hollow cylindrical handle portion axially and rotatably movable relative to the coiling spool overlying the cylindrical portion of the spool adjacent the handle means and a radially outwardly extending guide disk adjacent the inner end of the elongated slot whereby the first end of a strap may be placed in the slot adjacent the guide disk, the guide disk held relatively stationary while the spool is rotated about its axis, coiling the strap adjacent the guide and upon completion of the coiling, the ejection and guide means moved axially relative to the spool removing the coiled strap.

2. A mechanism for quickly and easily forming an elongated strap into a uniform coil comprising:
   a. a first crank portion including an elongated spool means having a radial crank arm rigidly secured to one end thereof and a slot parallel to the axis of the opposite end thereof,
   b. first handle means secured to the outer end of the crank arm extending outwardly therefrom along an axis approximately parallel to the axis of the spool means,
   c. ejection and guide means removably mounted upon the spool means of the crank portion having a hollow cylindrical handle section shorter than the spool means for slideably receiving the spool means and located with one end abutting the inner end of the crank arm and a guide plate secured to the cylindrical section at the end opposite the abuttment with the crankarm and extending radially outwardly therefrom whereby the first end of a strap may be inserted in the slot of the spool adjacent the guide means, the user may grasp each of the handles and cause relative rotation thereof coiling the strap about the spool and upon completion of the coiling cause the two portions to move relatively axially to eject the coiled strap from the spool means.

\* \* \* \* \*